United States Patent Office 3,772,446
Patented Nov. 13, 1973

3,772,446
PROCESS FOR PREPARING AN AQUEOUS α-MONO-GLYCERIDE OINTMENT BASE AND PRODUCT THEREOF
Kåre Larsson, Marklandsgatan 31, Goteborg, Sweden
No Drawing. Continuation of abandoned application Ser. No. 671,802, Sept. 29, 1967. This application May 4, 1970, Ser. No. 48,790
Claims priority, application Sweden, Sept. 30, 1966, 13,181/66
Int. Cl. A61k 9/06
U.S. Cl. 424—365                                 9 Claims

ABSTRACT OF THE DISCLOSURE

An aqueous ointment base containing 50–90% water and hydrophilic crystals of an α-monoglyceride of a 12–18 C fatty acid. It may be prepared by keeping an aqueous dispersion of particles of the α-monoglyceride above its transition temperature until the particles have absorbed water and been transformed into microscopic liquid-crystalline particles and slowly cooling the dispersion under stirring to ambient temperature.

---

This application is a continuation of my earlier co-pending application Ser. No. 671,802, filed Sept. 29, 1967, now abandoned.

The invention relates to ointments and more particularly to an ointment base useful for dermatological, i.e. medical and cosmetic purposes, as well as to a process for the preparation thereof.

Conventional aqueous ointment bases are of the emulsion type, oil-in-water or water-in-oil, in which the molecules appear in a non-ordered structure, apart from a layer of oriented molecules in the oil-water interface which act to stabilize the emulsion. Some cosmetic ointments contain also a crystalline substance rendering the ointment a glossy appearance. In this case the crystalline portion consists of spherical aggregates of microcrystals and may have been obtained by subjecting the oil phase in an oil-in-water emulsion to crystallization by cooling.

It is an object of the invention to provide an ointment base having superior properties with regard to consistency and spreading. Thus it is an object to provide an ointment base which permits the ointment prepared therefrom easily to spread over the skin to form a well covering layer, also over moist surfaces, e.g. discharging skin areas and open wounds. Another object is to obtain ointments which can be easily removed from the body by simple rinsing with water, without emulgators, detergents or other additions. A further object, in order to obtain the above objects of the invention, is to produce a dispersion in an aqueous phase of hydrophilic (water attracting) particles having a very large surface relative to their volume and having such properties as to form a thin and highly coherent lipid layer upon spreading onto the skin.

In order to attain these objects and other advantages that will appear from the following description, the present ointment base for or in dermatological ointments is an aqueous dispersion which comprises a lipid phase of hydrophilic crystals of α-monoglycerides of aliphatic carboxylic acids of the fatty acid type, preferably having 12–18 carbon atoms in the chain, dispersed in an essentially aqueous phase. The water content of the ointment or ointment base should be 50–90 percent by weight.

Among the monoglycerides that may be used according to the invention the α-monolaurin has been found to be excellent, and also α-monomyristin, α-monopalmitin or α-monostearin or any combination of these glycerides can be used with advantage. These glycerides are compatible with the human body as they form intermediary products of the fat metabolism.

The rheological properties can be modified arbitrarily, within given limits, by using different glycerides or mixtures thereof. The higher the chain length and percentage of long chain glycerides the stiffer is the ointment base. An exceedingly easily spreadable ointment base is obtained from α-monolaurin alone. The α-monoglycerides are well known substances of lipid character and can be prepared according to several known methods. All known methods for the preparation and crystallization render, however, hydrophobic, i.e. water repellent crystals.

A dermatologically active substance may be incorporated in the aqueous phase or in the lipid phase or be accumulated in the interface between these phases or be present in any two or three thereof.

Surface active substances, i.e. monolaurin, have been used in ointment bases in the prior art. These prior ointment bases, however, are water-free, contrary to the present ointment base which shall contain water and crystals having previously unknown surface active properties.

The novel ointment base is fundamentally different from those of the prior art inasmuch as it contains crystals, i.e. bodies of perfect molecular order, which due to their surface active properties can give a stable aqueous dispersions containing up to 90% water. The new ointment base is also fundamentally different from the prior cosmetic ointments containing a crystalline ointment substance, inasmuch as it only consists of an aqueous medium containing very thin leaf-shaped crystals, so that a large contact surface is obtained between the crystalline phase and the water phase. An important consequence of the hydrophillic surface structure is the fact that the ointment base can form a membrane over open wounds and discharging skin areas. Moreover, the ointment can easily be removed, rinsing with water being sufficient, which is an essential and valuable property of the ointment base when applied to sore or sensitive skin areas. It is also advantageous in cosmetic ointments and creams which may be used as cleansing agents.

Another advantage of the novel ointment base is the fact that an ointment having high water content can supply water to dry skin, whereas an ointment having a low water content, e.g. 50%, has a tendency to increase its own water content, which renders it disiccating to wounds and other moist skin portions.

It is also possible to change the pH of the aqueous phase, for instance to a accommodate it to the pH of the skin, or to add salts influencing the permeability of water through the skin.

The function of the present ointment base is founded on the mutual interaction betwen a surface-active crystalline phase and a liquid phase. Water, as present in the ointment base of the invention, moves into the skin at a high rate, and this water transport should highly improve the penetration of active substances dissolved in the water phase. Active substances can also be introduced into the water phase in the form of a dispersion or be solubilized in the lipid crystals of the present ointment base, and they will then have about the same penetration properties as if they were present in ointment bases of conventional types.

The ointment base may be prepared in the following way. The lowest temperature at which water can penetrate crystals of the actual α-monoglyceride, the transition temperature, is first determined. This is best done by using a polarizing microscope equipped with a heating table. A crystal is placed on the test glass thereof in contact with water in excess and is observed as the temperature is slowly increased, a heating rate of 1° C./min. being suitable. The transition temperature, to be registered, is reached when water penetrates the crystal lattice and gives cylindrical and spherical particles with strong birefringence.

A mixture of the actual α-monoglyceride or α-monoglycerides and water is prepared. The amount of water must be in the interval 50–90% by weight, and 70–80% is best suited for most applications. The mixture is brought to a temperature above the transition temperature, preferably 5–15° C. above the transition temperature. The temperature is kept there under stirring until equilibrium is reached, i.e., all solid substances have been transformed into microscopic liquid-crystalline particles. It is convenient to keep the temperature about 10° C. above the transition temperature in order to reach the desired equilibrium and avoid other liquid-crystalline structures than said microscopic particles. The temperature of the equilibrium mixture is then lowered slowly down to ambient temperature (such as 20° C.) under stirring. The stirring must be fast enough to prevent separation of a homogeneous water phase in the mixture but slow enough to prevent formation of foam in the mixture. The temperature should be lowered with a rate of 0.5–5° C./min. until crystallization takes place, and after that the cooling rate is not important. The higher the cooling rate is before crystallization the smaller become the crystals of the ointment base, and the cooling rate can therefore be used for obtaining the desired properties in this respect.

The active substance which should be present in the ointment can easily be introduced into the ointment base as by stirring, so as to form a solution or dispersion in the water phase. It can also be incorporated into the surface-active crystals, if it is a lipophilic substance and is added to the mixture before crystallization takes place.

An example of the new ointment base with very good cosmetic properties can be prepared from a mixture of 25% by weight of α-monolaurin and 75% by weight of water according to the procedure described above. The mixture is heated to 60° C. and kept there until equilibrium is reached, and the temperature is lowered 1° C./min. down to room temperature under stirring.

It can be ascertained by X-ray diffraction and infrared spectroscopic techniques whether the crystals are hydrophilic and have a surface layer of ordered molecules.

What is claimed:

1. An aqueous ointment base suitable for dermatological application which comprises a dispersion of hydrophilic crystals of α-monoglyceride selected from the group consisting of α-monolaurin, α-monomyristin, α-monopalmitin, α-monostearin and any combination thereof, in 50–90% by weight water prepared by mixing said α-monoglyceride with a sufficient amount of water, heating the resulting aqueous admixture to a temperature of about 5–15° C. above the transition temperature of the mixture, said transition temperature being the lowest temperature at which the α-monoglyceride particles in excess of water absorb water and transform into spherical and cylindrical microscopic liquid-crystalline particles of strong birefringence, maintaining the mixture above the transition temperature with stirring until the α-monoglyceride is so transformed into said liquid-crystalline particles and an equilibrium is reached, and thereafter cooling the heated mixture to ambient temperature at a rate of 0.5–5° C./min. with stirring until crystallization occurs.

2. An aqueous ointment base according to claim 1 wherein the α-monoglyceride is dispersed in 70–80% by weight water.

3. An aqueous ointment base according to claim 2 wherein the α-monoglyceride consists of α-monolaurin.

4. An aqueous ointment base according to claim 1 wherein the hydrophilic crystals are leaf-shaped.

5. A process for preparing a composition consisting essentially of an aqueous dispersion which comprises mixing an α-monoglyceride selected from the group consisting of α-monolaurin, α-monomyristin, α-monopalmitin, α-monostearin and mixtures thereof with 50–90% by weight water, heating the resulting aqueous admixture to a temperature about 5–15° C. above the transition temperature, said transition temperature being the lowest temperature at which the α-monoglyceride particles in excess of water absorb water and transform into spherical and cylindrical, microscopic liquid-crystalline particles of strong birefringence, maintaining the mixture above the transition temperature with stirring until the α-monoglyceride is so transformed into said liquid-crystalline particles and an equilibrium is reached and cooling the heated mixture to ambient temperature at a rate of 0.5–5° C. per minute with stirring.

6. A process according to claim 5 wherein the α-monoglyceride is mixed with 70–80% by weight water.

7. A process according to claim 5 wherein said aqueous admixture is heated to a temperature 10° C. above the transition temperature.

8. A process according to claim 5 for preparing a composition consisting of a dispersion of α-monolaurin in water which comprises mixing 25% by weight α-monolaurin with 75% by weight water, heating the resulting admixture to 60° C., maintaining the mixture at 60° C. with stirring until the α-monolaurin is transferred into microscopic liquid-crystalline particles of strong birefringence and an equilibrium is reached and cooling the heated mixture with stirring to room temperature at a rate of 1° C. per minute.

9. A process for preparing an aqueous ointment base consisting essentially of an aqueous dispersion of crystals of a hydrophilic α-monoglyceride which comprises mixing at least one α-monoglyceride selected from the group consisting of an α-monolaurin, α-monomyristin, α-monopalmitin and α-monostearin with 50–90% by weight water, heating the resulting aqueous admixture to a temperature above the transition temperature, said transition temperature being the lowest temperature at which the α-monoglyceride particles in excess of water absorb water and transform into spherical and cylindrical, microscopic liquid-crystalline particles of strong birefringence, maintaining the mixture above the transition temperature with stirring until the α-monoglyceride is so transformed into said liquid-crystalline particles and an equilibrium is reached and cooling the heated mixture with stirring at a rate of 0.5–5° C. per minute.

References Cited

UNITED STATES PATENTS

| | | | |
|---|---|---|---|
| 2,910,491 | 10/1959 | Baldinus | 260—410.7 |
| 3,111,409 | 11/1963 | Jackson et al. | 99—91 |
| 3,379,535 | 4/1968 | Landfried et al. | 99—91 |

OTHER REFERENCES

Encyclopedia of Chemical Technology, p. 788, vol. 8, 1965.

American Chem. Society J., Lutton et al., pp. 2445–49, vol. 70, 1948.

American Chem. Society Jour., Merker et al., pp. 516–19, vol. 80, 1958.

SAM ROSEN, Primary Examiner